US008171321B2

(12) United States Patent
Kumar et al.

(10) Patent No.: US 8,171,321 B2
(45) Date of Patent: May 1, 2012

(54) METHOD AND APPARATUS FOR COST AND POWER EFFICIENT, SCALABLE OPERATING SYSTEM INDEPENDENT SERVICES

(75) Inventors: Arvind Kumar, Beaverton, OR (US); Per Hammarlund, Hillsboro, OR (US); Glenn Hinton, Portland, OR (US); Johan G. Van De Groenendaal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 11/964,439

(22) Filed: Dec. 26, 2007

(65) Prior Publication Data

US 2009/0172438 A1 Jul. 2, 2009

(51) Int. Cl.
*G06F 1/00* (2006.01)
(52) U.S. Cl. .......................... 713/323; 713/340; 710/305
(58) Field of Classification Search .......... 713/320–324; 710/240, 305–306
See application file for complete search history.

(56) References Cited

U.S. PATENT DOCUMENTS 6,643,771 B2 * 11/2003 Tsushima et al. ................. 713/1
2002/0188877 A1 * 12/2002 Buch ............................. 713/320

FOREIGN PATENT DOCUMENTS

CN 1599320 A 3/2005

OTHER PUBLICATIONS

Office Action received for Chinese Patent Application No. 200810190220.X, mailed on Aug. 12, 2010, 7 pages pf English translation.
Office Action received for Chinese Patent Application No. 200810190220.X mailed Feb. 1, 2011; 20 pages including 11 pages of English Translation.

* cited by examiner

*Primary Examiner* — Brian Misiura
*Assistant Examiner* — Kim Huynh
(74) *Attorney, Agent, or Firm* — Mnemoglyphics, LLC; Lawrence M. Mennemeier

(57) ABSTRACT

A low cost, low power consumption scalable architecture is provided to allow a computer system to be managed remotely during all system power states. In a lowest power state, power is only applied to minimum logic necessary to examine a network packet. Power is applied for a short period of time to an execution subsystem and one of a plurality of cores selected to handle processing of received service requests. After processing the received service requests, the computer system returns to the lowest power state.

29 Claims, 4 Drawing Sheets

METHOD AND APPARATUS FOR COST AND POWER EFFICIENT, SCALABLE OPERATING SYSTEM INDEPENDENT SERVICES

FIELD

This disclosure relates to computer systems and in particular to cost efficient and scalable operating system independent services in a computer system.

BACKGROUND

A computer system is a layered device that includes a hardware layer, a firmware and operating system layer, and an applications program layer. The hardware layer of the computer system is often referred to as a physical platform. The physical platform may include processors, chipsets, communications channels, memory, boards and systems.

The computer system may also include a manageability engine including a microcontroller that is dedicated to allowing the computer system to be managed remotely via a remote management console over a communications network. The manageability engine allows the computer system to be managed remotely even when the computer system is in a low-power (standby/hibernate) state.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
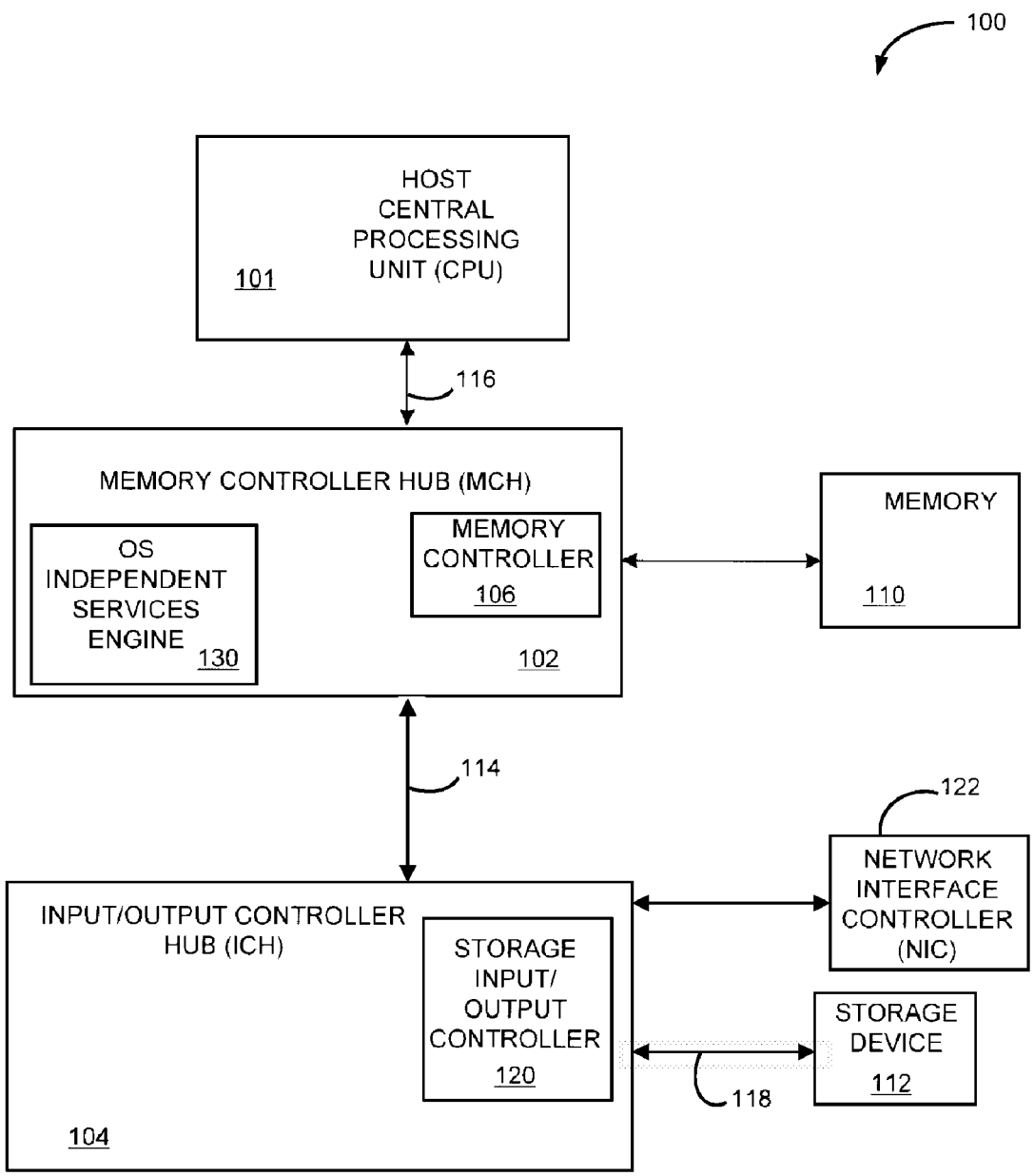
FIG. 1 is a block diagram of a system that includes hardware based operating system independent services engine.

FIG. 1 is a block diagram of an embodiment of a system that includes an operating system (OS) independent services engine 130. The system 100 includes a processor 101 that includes a Memory Controller Hub (MCH) 102 and an Input/Output (I/O) Controller Hub (ICH) 104. The MCH 102 includes the OS independent services engine 130, and a memory controller 106 that controls communication between the processor 101 and memory 110. The processor 101 and MCH 102 communicate over a system bus 116. In another embodiment, the functions of the MCH 102 may be included in the processor 101 and the processor 101 directly coupled to the ICH 104 and memory 110.

The OS independent services engine 130 in the ICH 104 implements various services on behalf of, but not limited to, management, security and power applications. For example, the OS independent services engine 130 may control out-of-band (OOB) accesses over a communications network through a Network Interface Card (NIC) 122. A portion of the memory 110 is dedicated to the OS independent services engine 130, for example, to store instructions and run-time data. The MCH 110 protects this dedicated portion of the memory 110 from being accessed by the processor 101.

In order to reduce power consumption of the system, the system may include support for power management. For example, a method for providing power management discussed in "Advanced Configuration and Power Interface Specification", Revision 2.0c, Aug. 25, 2003 includes six power states labeled S0-S5. The power states range from state S0 in which the system is completely powered on and is fully operational to state S5 in which the system is completely powered off. The other states S1-S4 are referred to standby/hibernate or sleep states. In the standby/hibernate states, power consumption is reduced and the system appears to be off. However, the system retains sufficient context to allow the system to return to state S0 without a system reboot.

In standby state, power is not provided to the monitor and hard disks in order to reduce battery power consumption. However, information stored in volatile memory is not saved to non-volatile memory such as a hard disk. Thus, information stored in volatile memory may be lost if there is an interruption in the power to the volatile memory. In hibernate state, information that is stored in volatile memory is saved to non-volatile storage prior to removing power from the hard disk and the monitor. When returning from hibernate state, the information that was stored in non-volatile memory is restored to the volatile memory so that the system appears as it was prior to entering the hibernate state.

In order to allow out-of-band accesses, the OS independent services engine 130 is available in all of the system power states (S0-S5). However, the OS independent services engine 130 adds additional cost to the computer system and increases the power consumption of the computer system due to the power that that the OS independent services engine 130 consumes when the computer system is in standby/hibernate power states.

Instead of providing a dedicated OS independent services engine 130, an embodiment of the present invention provides a low cost, low power consumption scalable architecture to allow a computer system to be accessed/managed out-of-band (OOB) during all system power states.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 110 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 120 for controlling communication with at least one storage device 112 coupled to the ICH 104. The storage device 112 may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA). The ICH 104 may be coupled to a Network Interface controller (NIC) 122 to allow communication over a communications network.

Figure 2:
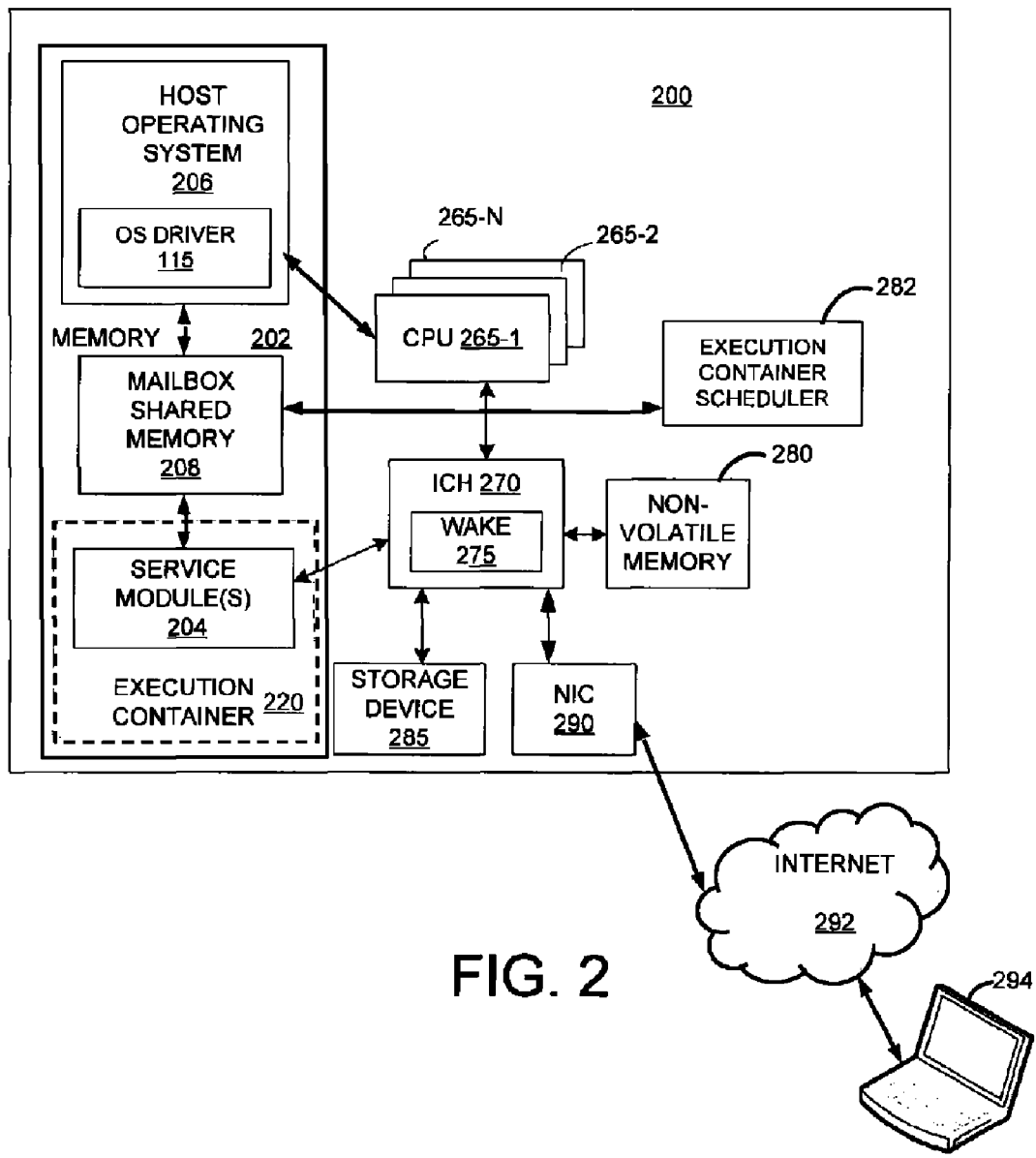
FIG. 2 is a block diagram of an embodiment of a system that includes a low power consumption scalable execution container that is accessible both out-of-band and in-band according to the principles of the present invention.

FIG. 2 is a block diagram of an embodiment of a system 200 that includes low power consumption scalable execution container 220 that is accessible both out-of-band and in-band according to the principles of the present invention. An embodiment of the execution container 220 will be described as used by management services. However, the invention is not limited to management services. Any platform services (operating system independent services) may use the execution container. Examples of platform services include security and power applications.

The system 200 includes a plurality of Central Processing Units (CPUs) 265-1 . . . , 265-N coupled to one or more Input/Output Controller Hubs (ICHs) 270. In the embodiment shown, memory 202 is shared by the plurality of CPUs 265-1 . . . , 265-N. The memory 202 may store a host operating system 206 that is shared by the plurality of CPUs 265-1 . . . , 265-N. In other embodiments the host operating system 206 may be replaced by a hypervisor.

The system includes an execution subsystem that includes one or more service modules 204 a mailbox shared memory 208 in memory 202, an execution subsystem wake module 275 in the ICH 270, a host operating system driver 115 and an execution container scheduler 282. The host operating system driver 115 allows applications running in the system 200 to communicate with services running in the execution container.

The service module may include a micro-kernel, operating system and a set of applications that represent the services being executed. In an embodiment, the execution container scheduler 282 includes microcode in each of the plurality of CPUs 265-1 . . . , 265-N CPU, and logic to coordinate between the plurality of CPUs 265-1 . . . , 265-N. The embodiment shown in FIG. 2 has one execution container having one or more services modules 204, in other embodiments there may be a plurality of execution containers each having a separate kernel in a respective one or more service modules 204.

In another embodiment, the system 200 may include a virtual machine. A virtual machine is one of a number of discrete execution environments in the system 200. Each virtual machine may execute an operating system and is isolated from the other virtual machines so that each virtual machine appears to a user to "own" all the hardware resources of the system 200. Typically, a virtual machine monitor (VMM), provides the capability to share the system's hardware resources among the virtual machines. In some systems, a virtual machine monitor may simulate the complete hardware or partially simulate some of the hardware. In other systems, instead of simulating hardware, the virtual machine monitor may provide access to the hardware resources through an Applications Programming Interface (API). Thus, through the use of VMM, one physical platform can function as multiple "virtual" machines.

A portion of the memory 202 is dedicated to the service module 204. The service module 204 is not visible to the operating system 206 in an embodiment that includes an operating system or hypervisor. FIG. 2 illustrates an embodiment that includes a host operating system 206. Another portion of the main system memory 202 is mailbox shared memory 208. The mailbox shared memory 208 is used for communication between the service module 204 and the host operating system 206 for information exchange. For example, the mailbox shared memory 208 may be used by a service within the service module 204 to monitor whether an agent in the host operating system 206 is running. The agent may send periodic keep-alive packets through the mailbox shared memory 208 to the service module 204. Upon detecting that the agent has stopped sending keep-alive packets, the service module 204 determines that the agent has stopped running and the service module 204 may take appropriate action.

In an embodiment, the service module 204 includes a scheduler that may schedule a service thread for a small time slice of one of the plurality of CPUs. For example, a manageability service thread may be scheduled to serve a network packet received from a remote console 294 over the Internet 292 by the Network Interface Card (NIC) 290.

An execution subsystem wake module 275 is included in the ICH 270. In one embodiment, the execution subsystem wake module 275 is implemented in hardware logic and is active during all power states including all low power states. The execution subsystem wake module 275 is used to wakeup the service module 204 whenever a request is received through the network interface card (NIC) 290 that requires servicing by the service module 204. For example, the request may be a management request received from the remote console 294 through the NIC 290 or a timer request that may be received from the NIC 290.

A compressed image that includes code (instructions) for the service module 204 may be stored in non-volatile random access memory 280 that may be coupled to the ICH 270. The code may include a mini-operating system (OS) and manageability applications.

In an embodiment, the service module 204 runs an embedded operating system, for example, the embedded operating system may be embedded Linux®. The service module 204 also runs a normal software stack. However, the environment of the service module 204 is invisible to the host operating system 206 running on the system. The host operating system 204 only communicates to the service module 204 via a platform services device driver 115 in the host operating system 206 through mailbox shared memory 208. Thus, the service module 204 appears like a management controller and management firmware to the Operating System/Virtual machine manager.

A execution container scheduler 282 schedules a time-slice of one of the plurality of CPUs 265-1 . . . , 265-N to load the compressed code (instructions) for the service module 204 that is stored in non-volatile memory 280 into memory 202 when needed. For example, the code for the service module 204 may be loaded into memory 202 and run by one of the plurality of to CPUs 265-1 . . . , 265-N to serve a network packet in response to a manageability request received through the NIC 290.

In an embodiment, the non-volatile random access memory may be flash memory. In an embodiment, the compressed code for the service module 204 may be stored in the same non-volatile memory used to store a Basic Input Output System (BIOS) that is used by the CPUs 265-1 . . . , 265-N.

The service module 204 also has access to the ICH 270 for manageability, for example, to allow access to an access channel (Input/Output (IO)) bus. The IO bus may be a System Management Bus (SMBus), Universal Serial Bus (USB), a Peripheral Component Interconnect Express (PCIe) system bus or any other type of IO bus. The access channels from the service module 204 to the ICH 270 allow the NIC 290 to send and receive packets to/from the service module 204.

Not all of the capabilities of the execution subsystem are required in each of the various system power states. Thus, various capabilities may be placed in sleep mode based on the particular power state in order to reduce power consumption in the system 200. In an embodiment, four stages of operation are identified, with each stage (system power state) capable of using one or more capabilities of the execution subsystem.

The system also includes a non volatile memory for fast 'hibernate' and 'resume' of the execution subsystem. Hibernate is used to conserve power usage. The non volatile memory may be the same non-volatile memory that stores the service module 204. However, in an embodiment, the non volatile memory used for fast hibernate has faster read/write characteristics. While storing/retrieving the service module 204 the first time does not require fast access to non-volatile memory. During 'hibernate' the entire memory image is stored in the non-volatile memory and system then goes to low-power mode (standby power). During 'resume', the image from non-volatile memory is copied to memory 202, and starts executing from the memory 202 in the state at which the hibernate occurred.

The execution subsystem wake module 275 is always available (active) in all system power states to provide initial filtering of network packets received by the NIC 290 and to wake up the execution subsystem when a packet of interest is received. In an embodiment, the execution subsystem wake module 275 includes a microcontroller or logic that provides functions of a microcontroller. In the embodiment shown, the microcontroller is included in the ICH 270. In other embodiments the microcontroller may be in a processor uncore, or in a NIC 290 that supports communication over a network such as a Local Area Network (LAN), wireless (WiFi) networks, microwave (WiMAX) networks or any other type of communications network.

Figure 3:
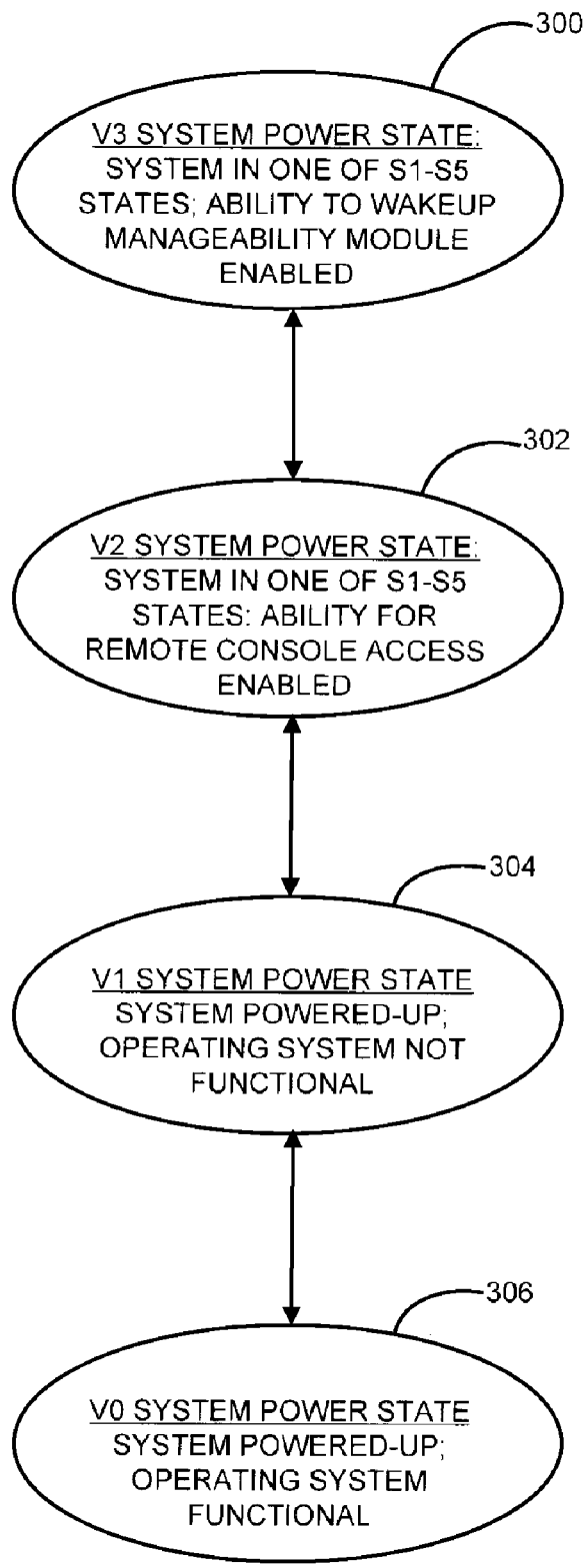
FIG. 3 illustrates system power states in the system shown in FIG. 2.

FIG. 3 illustrates system power states in the system 200 shown in FIG. 2.

A first system power state—normal low power state "V3" 300 is the lowest system power state. The capability that may be required is to access the system 200 over a network (Internet 292) to wake up the management subsystem. In state V3, the system 200 is powered off or in one of the standby/ hibernate power states that is, the S1-S5 power states discussed earlier. While the system is in one of the S1-S5 power states, the CPUs 265-1, . . . 265-N are not active.

Only the execution subsystem wake module 275 and networking modules in the NIC 290 are active (powered on) allowing the NIC 290 to handle received network packets and the execution subsystem wake module 275 to receive an indication from the NIC 290 that the management subsystem is to be woken up.

A second system power state—on receiving a request from the network "V2" 302 is the next lowest system power state. In system power state V2 a remote management console may try to access some information while the system is powered off (power state S0) or in one of the standby/hibernate power states (S1-S5). For example, the information may be required by a remote console to identify the system in order to determine if this is the system to be serviced remotely. The execution subsystem may be transitioned into the V2 system power state temporarily in order to respond to a management request from a remote management console.

In the V2 state, the execution subsystem transitions from 'hibernate' mode to 'resume' mode. To transition to 'resume' mode, the image from non-volatile memory is copied to memory 202, and the service module 204 starts executing from the memory 202 in the state at which the hibernate occurred. In V2, the execution subsystem 'image' is retrieved from non-volatile memory so that the service module 204 and execution container scheduler 382 may handle received manageability requests received by the NIC 290 in network packets over the network.

In system power state V2, ICH 270, NIC 290, one of the plurality of CPUs 265-1, . . . 265-N and associated logic and input/output links are powered on (active) in order to process the manageability network packet received by the NIC 290. In order to be most power friendly, in one embodiment, the execution container scheduler 282 wakes up the CPU 265-1, . . . 265-N that was powered on most recently (warm core) and is in the lowest processor performance states (P-states) or voltage/frequency operating points. P-states are lower power capability states within the normal state of a CPU (core).

Thus, power is only applied to minimal logic (execution subsystem wake module 275) in the ICH 270 to listen for a management network packet. A portion of a bootstrap processor also has power applied to it. In an embodiment, an interrupt is generated when the management network packet is received. The interrupt activates a thread that is handled by the bootstrap processor to select one of the CPUs to handle the received management network packet.

The execution container scheduler 282 optimizes on power, responsiveness and impact to system resources. When the system 200 is in system power state V2, the execution container scheduler 282 uses the most aggressive policy to return to system power state V3, that is, to put the service module 204 to sleep as soon as a packet is served.

However, the execution container scheduler 282 also keeps track of the number of transitions between power state V3 and power state V2. If the number of transitions between power state V3 and power state V2 occur too often, that is, the number of transitions is above a predetermined threshold, the power policy may be too aggressive. The execution container scheduler 282 may wait longer in power state V2 prior to transitioning to power state V3 state.

A third system power state—pre-operating system, post operating system, Basic Input Output System (BIOS) "V1" 304 is when the system 200 is powered up but the operating system is either not yet installed or is not functional. Capabilities that may be required in the V1 system power state include serial redirection and media redirection. Power is applied to the CPUs 265-1, . . . 265-N, ICH 270, non-volatile memory 270, storage device 285 and NIC 290. The execution container scheduler 285 provides a time slice to the service module 204 which runs independent of the host operating system 206.

A fourth system power state—concurrent with operating system "V0" 306 is the highest power stage. In the V0 stage the entire system 200 is powered up and the operating system is functional. Capabilities that may be required in the V0 system power state include network traffic filtering and circuit breaker.

When the system is in system power state V0, that is, normal operating mode with the operating system/virtual machine manager running and functional, the execution container scheduler 282 ensures that there is no significant impact to the host Virtual Machine Manager/Operating System to perform management functions.

In normal idle conditions, typically the execution subsystem does not receive many management requests and so uses less CPU cycles. However, when the service module 204 is processing a compute intensive task, for example, a Remote-Keyboard Video, Mouse session, then the execution subsystem consumes more CPU cycles.

The execution container scheduler 282 limits the allocation to the service module 204 to a maximum configured percentage of the overall CPU time slice. In an embodiment, only five percent of the CPU time slice may be assigned to the service module 204. The execution container scheduler 204 ensures that the service module 204 gets at least the minimum configured time slice. This is to ensure that a misbehaving Virtual Machine Manager/Operating System does not use all of the available CPU time slice.

The execution container scheduler 282 schedules a service thread as evenly as possible across different cores (CPUs). This approach to scheduling is performed to spread load amongst the cores so as not to impact the way the host operating environment allocates and uses the cores. For example, in an embodiment in which the host operating environment is a hypervisor and has allocated cores to particular virtual machines, the execution container scheduler 282 schedules a service thread as evenly as possible across different cores so as not to tax one core more than another.

After the service module 204 receives notification of a manageability packet received from the NIC 290, the service module 204 may communicate with the NIC 290 using standard networking drivers for PCIe or USB network device drivers or by using PCIe Vendor Defined Messages (VDMs).

The execution subsystem is an optimized modular architecture that meets the requirements in the four system power states (V1-V3) discussed above and provides a scalable architecture.

Figure 4:
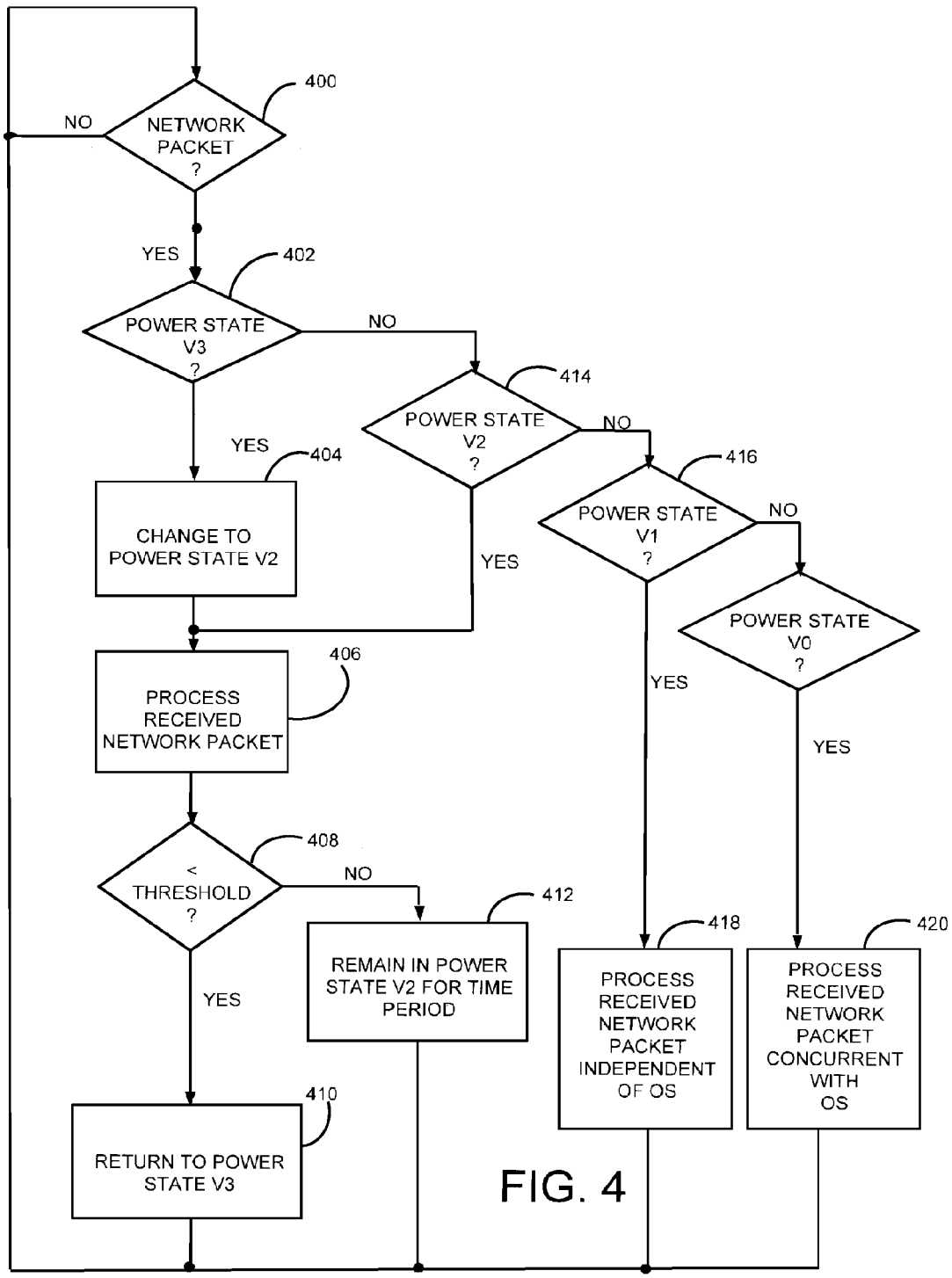
FIG. 4 is a flowgraph illustrating an embodiment of a method to provide manageability services using the execution subsystem shown in FIG. 2.

FIG. 4 is a flow graph illustrating an embodiment of a method to provide manageability services using the execution subsystem shown in FIG. 2.

At block 400, the execution subsystem wake module 275 monitors the NIC 290 for received network packets for processing by the execution subsystem. If a network packet is received for the execution subsystem, processing continues with block 402. If not, processing remains in block 400 to wait for a manageability related network packet.

At block 402, if the current power state is V3, processing continues with block 404. If not, processing continues with block 414.

At block 404, the ICH 270, NIC 290 and one of the plurality of CPUs 265-1, . . . 265-N are powered on in order to process the manageability related network packet received by the NIC 290. The execution subsystem transitions from "hibernate" mode to "resume" mode by copying the image from non-volatile memory 280 to memory 202. Processing continues with block 406.

At block 406, the network packet is processed by the execution subsystem. Processing continues with block 408.

At block 408, if the number of transitions between power state V3 and power state V2 is above a predetermined threshold indicating that the power policy may be too aggressive, processing continues with block 412. If not, processing continues with block 410.

At block 410, the power state transitions back to power state V3 with the manageability system transitioning to "hibernate" mode and the ICH 270 and the selected one of the plurality of CPUs 265-1, . . . 265-N are powered off. Processing continues with block 400 to wait for another network packet to process.

At block 412, the execution container scheduler 282 remains in power state V2 for a time period prior to transitioning to power state V3 state. Processing continues with block 400 to wait for another network packet to process.

At block 414, if the current power state is V2, processing continues with block 406 to process the received network packet. If not, processing continues with block 416.

At block 416, if the current power state is V1, processing continues with block 418. If not processing continues with block 420.

At block 418, in power state V1, the operating system is either not yet installed or is not functional. The CPUs 265-1, . . . 265-N, ICH 270, non-volatile memory 270, storage device 285 and NIC 290 are powered on. The execution container scheduler 285 provides a time slice to the service module 204 which runs independent of the host operating system 206 to process the received network packet. Processing continues with block 400 to process the next received network packet.

At block 420, the current power state is V0, power is applied to the entire computer system 200 and the operating system is functional. The execution subsystem is given a time slice to process the received network packet. Processing continues with block 400 to process the next received network packet.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
    a plurality of processing units; and
    a wake module in an execution subsystem coupled to the plurality of central processing units, power being applied to the wake module in all of a plurality of system power states including at least one system power state wherein an operating system is not functional, the wake module to listen for a service request in a network packet received over a communication network and upon detecting the service request while in a first system power state, the execution subsystem to transition to a second system power state by selecting just one of the plurality of central processing units to be powered on to handle the service request in the second system power state.

2. The apparatus of claim 1, wherein the transition to the second system power state comprises transitioning the execution subsystem from hibernate mode to resume mode.

3. The apparatus of claim 2, after the service request is handled, the execution subsystem transitions back to the first system power state by transitioning the execution subsystem from resume mode to hibernate mode and powering off the selected processing unit.

4. The apparatus of claim 3, wherein the execution subsystem delays transitioning back to the first system power state if a number of transitions between the first system power state and the second system power state is above a threshold number of transitions.

5. The apparatus of claim 1, wherein the wake module includes minimum logic to examine the network packet.

6. The apparatus of claim 1, wherein the first system power state is a lowest power consumption system power state.

7. The apparatus of claim 1, wherein while in a highest power consumption system power state a maximum configured percentage of an overall Central Processing Unit (CPU) time slice is allocated to handling service requests.

8. The apparatus of claim 1, wherein the execution subsystem to power on logic and input/output links associated with the selected central processing unit to handle the service request.

9. The apparatus of claim 8, wherein the execution subsystem to power off logic and input/output links associated with the selected central processing unit powered on to handle the service request.

10. A method comprising:
applying power to a wake module in an execution subsystem in all of a plurality of system power states including at least one system power state wherein an operating system is not functional;
listening, by the wake module for a service request received over a communication network; and upon detecting a service request in a network packet received over a communication network; and
upon detecting a service request while in a first system power state, transitioning to a second system power state by selecting just one of a plurality of central processing units to be powered on to handle the service request in the second system power state.

11. The method of claim 10, wherein the transition to the second system power state comprises transitioning the execution subsystem from hibernate mode to resume mode.

12. The method of claim 11, further comprising:
after the service request is handled, transitioning by the execution subsystem back to the first system power state by transitioning the execution subsystem from resume mode to hibernate mode and powering off the selected processing unit.

13. The method of claim 12, further comprising:
delaying, by the execution subsystem transitioning back to the first system power state if a number of transitions between the first system power state and the second system power state is above a threshold number of transitions.

14. The method of claim 10, wherein the wake module includes minimum logic to examine the network packet.

15. The method of claim 10, wherein the first system power state is a lowest power consumption system power state.

16. The method of claim 10, wherein while in a highest power consumption system power state a maximum configured percentage of an overall Central Processing Unit (CPU) time slice is allocated to handling service requests.

17. An article including a machine-accessible medium having associated information, wherein the information, when accessed, results in a machine performing:
applying power to a wake module in an execution subsystem in all of a plurality of system power states including at least one system power state wherein an operating system is not functional;
listening, by the wake module for a service request received in a network packet over a communication network; and
upon detecting a service request while in a first system power state, transitioning to a second system power state by selecting just one of a plurality of central processing units to be powered on to handle the service request in the second system power state.

18. The article of claim 17, wherein the transition to the second system power state comprises transitioning the execution subsystem from hibernate mode to resume mode.

19. The article of claim 18, further comprising:
after the service request is handled, transitioning by the execution subsystem back to the first system power state by transitioning the execution subsystem from resume mode to hibernate mode and powering off the selected central processing unit.

20. The article of claim 19, further comprising:
delaying, by the execution subsystem transitioning back to the first system power state if a number of transitions between the first system power state and the second system power state is above a threshold number of transitions.

21. The article of claim 17, wherein the wake module includes minimum logic to examine the network packet.

22. The article of claim 17, wherein the first power state is a lowest power consumption system power state.

23. The article of claim 17, wherein while in a highest power consumption system power state a maximum configured percentage of an overall Central Processing Unit (CPU) time slice is allocated to handling service requests.

24. A system comprising:
a dynamic random access memory;
a plurality of processing units; and
a wake module in an execution subsystem coupled to the plurality of central processing units, power being applied to the wake module in all of a plurality of system power states including at least one system power state wherein an operating system is not functional, the wake module to listen for a management packet received over a communication network and upon detecting the management packet while in a first system power state, the execution subsystem to transition to a second system power state by selecting just one of the plurality of central processing units to be powered on to handle the service request in the second system power state.

25. The system of claim 24, wherein the first power state is a lowest power consumption system power state.

26. The system of claim 24, wherein upon detecting the management packet while in said at least one system power state wherein the operating system is not functional but the system is already powered up, the execution subsystem is to cause one or more of the plurality of central processing units to run a service module to handle the management packet independent of the operating system.

27. The article of claim 17, wherein upon detecting a service request while in said at least one system power state wherein the operating system is not functional but the system is already powered up, the execution subsystem is to cause one or more of the plurality of central processing units to run a service module to handle the service request received in the network packet independent of the operating system.

28. The method of claim 10, wherein upon detecting a service request received in the network packet while in said at least one system power state wherein the operating system is not functional but the system is already powered up, the execution subsystem is to cause one or more of the plurality of central processing units to run a service module to process the network packet independent of the operating system.

29. The apparatus of claim 1, wherein upon detecting a service request while in said at least one system power state wherein the operating system is not functional but the system is already powered up, the execution subsystem is to cause one or more of the plurality of central processing units to run a service module to handle the service request received in the network packet independent of the operating system.

* * * * *